US010834505B2

(12) United States Patent
Geiger et al.

(10) Patent No.: US 10,834,505 B2
(45) Date of Patent: Nov. 10, 2020

(54) APPARATUS AND A METHOD FOR UNWRAPPING PHASE DIFFERENCES

(71) Applicant: Huawei Technologies Duesseldorf GmbH, Duesseldorf (DE)

(72) Inventors: Jürgen Geiger, Munich (DE); Kainan Chen, Munich (DE); Peter Grosche, Munich (DE)

(73) Assignee: Huawei Technologies Duesseldorf GmbH, Duesseldorf (DE)

( * ) Notice: Subject to any disclaimer, the term of this patent is extended or adjusted under 35 U.S.C. 154(b) by 0 days.

(21) Appl. No.: 16/424,147

(22) Filed: May 28, 2019

(65) Prior Publication Data

US 2019/0281386 A1    Sep. 12, 2019

Related U.S. Application Data

(63) Continuation of application No. PCT/EP2016/078929, filed on Nov. 28, 2016.

(51) Int. Cl.
*H04R 3/04*    (2006.01)
*G01S 3/80*    (2006.01)
(Continued)

(52) U.S. Cl.
CPC .............. *H04R 3/04* (2013.01); *G01S 3/8006* (2013.01); *G01S 3/8083* (2013.01);
(Continued)

(58) Field of Classification Search
CPC .............. H04R 3/005; H04R 2201/401; H04R 2430/21
(Continued)

(56) References Cited

U.S. PATENT DOCUMENTS

2009/0310444 A1* 12/2009 Hiroe .................... G01S 3/8006
367/125
2013/0272539 A1* 10/2013 Kim ...................... G01S 3/8006
381/92
(Continued)

FOREIGN PATENT DOCUMENTS

EP        2551849 A1    1/2013
WO      3529479 A1    11/1995

OTHER PUBLICATIONS

Valin et al., "Robust localization and tracking of simultaneous moving sound sources using beamforming and particle filtering," Robotics and Autonomous Systems, vol. 55, No. 9, pp. 216-228, Elsevier—Amsterdam, Netherlands (Sep. 2007).

(Continued)

*Primary Examiner* — Alexander Krzystan
(74) *Attorney, Agent, or Firm* — Leydig, Voit & Mayer, Ltd.

(57) ABSTRACT

An apparatus configured to obtain a plurality of phase differences is provided. Each phase difference represents a difference in phase between a spectral component in a first sound signal and a corresponding spectral component in a second sound signal, to estimate an aliasing frequency. Phase differences in frequency bands above the aliasing frequency are expected to be wrapped, and to unwrap the plurality of phase differences in dependence on the estimated aliasing frequency. A phase difference obtained from spectral components that are comprised in one frequency band is unwrapped independently of any phase difference obtained from spectral components that are comprised in another frequency band.

20 Claims, 14 Drawing Sheets

(51) Int. Cl.
G01S 3/808 (2006.01)
G10L 21/0232 (2013.01)
H04R 1/40 (2006.01)
H04R 3/00 (2006.01)
H04R 29/00 (2006.01)

(52) U.S. Cl.
CPC .......... *G10L 21/0232* (2013.01); *H04R 1/406* (2013.01); *H04R 3/005* (2013.01); *H04R 29/005* (2013.01)

(58) Field of Classification Search
USPC .................................................. 381/92, 122
See application file for complete search history.

(56) References Cited

U.S. PATENT DOCUMENTS

| | | |
|---|---|---|
| 2014/0003635 A1 | 1/2014 | Mohammad et al. |
| 2014/0105416 A1* | 4/2014 | Huttunen ............... H04R 5/027 381/92 |
| 2015/0262576 A1* | 9/2015 | Oda .................... G10L 21/0216 704/233 |

OTHER PUBLICATIONS

Ihlefeld et al., "Effect of source spectrum on sound localization in an everyday reverberant room," The Journal of the Acoustical Society of America, vol. 130, No. 1, pp. 324-333, American Institute of Physics—College Park, Maryland (Jul. 2011).
Dibiase, "A High-Accuracy, Low-Latency Technique for Talker Localization in Reverberant Environments Using Microphone Arrays," Ph.D. Thesis, Brown University—Providence, Rhode Island (May 2000).
Amin et al., "Estimation of Direction of Arrival (DOA) Using Real-Time Array Signal Processing," 5th International Conference on Electrical and Computer Engineering, pp. 422-427, ICECE 2008—Dhaka, Bangladesh (Dec. 20-22, 2008).
Nikunen et al., "Direction of Arrival Based Spatial Covariance Model for Blind Sound Source Separation," IEEE/ACM Transactions on Audio, Speech, and Language Processing, vol. 22, No. 3, pp. 727-739, Institute of Electrical and Electronics Engineers—New York, New York (Mar. 2014).
Itoh, "Analysis of the phase unwrapping algorithm," Applied Optics, vol. 21. No. 14, p. 2470, Optical Society of America—Washington D.C., United States (Jul. 15, 1982).
Krämer et al., "Presentation of an improved Phase Unwrapping Algorithm based on Kalman filters combined with local slope estimation," Proceedings of the "Fringe 96" Workshop on ERS SAR Interferometry, Zurich, Switzerland, ESA-SP-406, p. 253, European Space Agency—Paris, France (Mar. 1997).
Reddy et al., "Direction-of-Arrival Estimation of Speech Sources Under Aliasing Conditions," IEEE International Conference on Acoustics, Speech, and Signal Processing, South Brisbane, Australia, pp. 1-5, Institute of Electrical and Electronics Engineers—New York, New York (Apr. 19-24, 2015).
Benesty, "Adaptive eigenvalue decomposition algorithm for passive acoustic source localization," Journal of the Acoustical Society of America, vol. 107, No. 1, pp. 384-391, American Institute of Physics—College Park, Maryland (Jan. 2000).
Buchner et al., "Simultaneous localization of multiple sound sources using blind adaptive MIMO filtering," IEEE International Conference on Acoustics, Speech, and Signal Processing, Philadelpia, United States, pp. 97-100, Institute of Electrical and Electronics Engineers—New York, New York (Mar. 18-23, 2005).
Lombard et al., "TDOA estimation for multiple sound sources in noisy and reverberant environments using broadband independent component analysis," IEEE Transactions on Audio, Speech, and Language Processing, vol. 19, No. 6, pp. 1490-1503, Institute of Electrical and Electronics Engineers—New York, New York (Aug. 2011).

Nesta et al., "Cooperative Wiener-ICA for Source Localization and Separation by Distributed Microphone Arrays," IEEE International Conference on Acoustics, Speech, and Signal Processing, Dallas, United States, pp. 1-4, Institute of Electrical and Electronics Engineers—New York, New York, (Mar. 14-19, 2010).
Navarro et al., "Fast two-dimensional simultaneous phase unwrapping and low-pass filtering," Optics Express, vol. 20, No. 3, pp. 2556-2561, Optical Society of America—Washington D.C., United States (Jan. 30, 2012).
Martin, "Noise Power Spectral Density Estimation Based on Optimal Smoothing and Minimum Statistics," IEEE Transactions on Speech and Audio Processing, vol. 9, No. 5, pp. 504-512, Institute of Electrical and Electronics Engineers—New York, New York (Jul. 2001).
MH Acoustics LLC, www.mhacoustics.com, Retrieved on Aug. 15, 2019.
Cooke et al., "An audiovisual corpus for speech perception and automatic speech recognition (L)," The Journal of the Acoustical Society of America, vol. 120, No. 5, pp. 2421-2424, American Institute of Physics—College Park, Maryland (Nov. 2006).
Wohlmayr et al., "Joint Position-Pitch Extraction from Multichannel Audio," Interspeech 2007, 8th Annual Conference of the International Speech Communication Association—Antwerp, Belgium (Aug. 27-31, 2007).
Lombard, "Localization of Multiple Independent Sound Sources in Adverse Environments," Ph.D. Thesis, University of Erlangen-Nuremburg—Bavaria, Germany (Jul. 27, 2012).
Backus et al.,"The Acoustical Foundations of Music," Physics Today, vol. 23, No. 5, pp. 69-70, American Institute of Physics—College Park, Maryland (1970).
Van Trees, "Detection, Estimation, and Modulation Theory, Part I: Detection, Estimation, and Linear Modulation Theory," John Wiley and Sons, Chichester, United Kingdom (2001).
Liu et al., "Wideband Beamforming: Concepts and Techniques," Wiley Series on Wireless Communications and Mobile Computing—John Wiley and Sons, Chichester, United Kingdom (2010).
Teutsch, "Wavefield Decomposition Using Microphone Arrays and Its Application to Acoustic Scene Analysis," Ph.D. Thesis, University of Erlangen-Nuremburg—Bavaria, Germany (Jan. 25, 2006).
Kazuyoshi et al. Analysis of the phase unwrapping algorithm, Applied Optics / vol. 21, No. 14 / Jul. 15, 1982, p. 2470.
Schmidt, R., Multiple Emitter Location and Signal Parameter—Estimation, IEEE Transactions on Antennas and Propagation, vol. AP-34, No. 3, Mar. 1986, pp. 276-280.
Roy, R. et al. ESPRIT—Estimation of Signal Parameters Via Rotational Invariance Techniques, IEEE Transactions on Acoustics. Speech. and Signal Processing. vol. 37. No. 7. Jul. 1989, pp. 984-995.
Yan, M. et al. Weighted Kalman Filter Phase Unwrapping Algorithm Based on Insar Image, Engineering Review vol. 33, Issue 3, 227-231, 2013, pp. 227-231.
Sukumar, P., et al. Phase Unwrapping with Kalman Filter based Denoising in Digital Holographic Interferometry, International Conference on Advances in Computing, Communications and Informatics (ICACCI), 2015, pp. 2256-2260.
Nico, G., et al. Bayesian Approaches to Phase Unwrapping: Theoretical Study, IEEE Transactions on Signal Processing, vol. 48, No. 9, Sep. 2000, pp. 2545-2556.
Nikumen, J., et al. Direction of Arrival Based Spatial Covariance Model for Blind Sound Source Separation, IEEE Transactions on Audio, Speech and Language Processing, pp. 1-14.
Dmochowski, J. et al. Direction of Arrival Estimation Using the Parameterized Spatial Correlation Matrix, IEEE Transactions on Audio, Speech, and Language Processing, vol. 15, No. 4, May 2007, pp. 1327-1339.
Amin, Md. S., et al. Estimation of Direction of Arrival (DOA) Using Real-Time Array Signal Processing and Performance Analysis, IJCSNS International Journal of Computer Science and Network Security, vol. 10 No. 7, Jul. 2010, pp. 43-57.
Tang, Z. et al. Aliasing-Free Wideband Beamforming Using Sparse Signal Representation, IEEE Transactions on Signal Processing, vol. 59, No. 7, Jul. 2011, pp. 3464-3469.

(56) References Cited

OTHER PUBLICATIONS

Shin, J. et al. Reduced-Complexity Maximum Likelihood Direction-of-Arrival Estimation Based on Spatial Aliasing, IEEE Transactions on Signal Processing, vol. 62, No. 24, Dec. 15, 2014, pp. 6568-6581.

Dmochowski, J. et al. On Spatial Aliasing in Microphone Arrays, IEEE Transactions on Signal Processing, vol. 57, No. 4, Apr. 2009, pp. 1383-1395.

Reddy, V. et al. Unambiguous Speech DOA Estimation Under Spatial Aliasing Conditions, IEEE/ACM Transactions on Audio, Speech, and Language Processing, vol. 22, No. 12, Dec. 2014, pp. 2133-2145.

\* cited by examiner

APPARATUS AND A METHOD FOR UNWRAPPING PHASE DIFFERENCES

CROSS-REFERENCE TO RELATED APPLICATIONS

This application is a continuation of International Application No. PCT/EP2016/078929, filed on Nov. 28, 2016, the disclosure of which is hereby incorporated by reference in its entirety.

TECHNICAL FIELD

Embodiments of this disclosure relate to an apparatus and method for unwrapping phase differences, which can then be used, for example, for localizing a sound signal.

BACKGROUND

Multichannel sound source localization has developed over several decades and involves Direction of Arrival (DOA) and Time Difference of Arrival (TDOA) estimation. Although existing algorithms can localize sound sources accurately in low-noise free-field conditions, it is still challenging to localize sound sources suffering from interference, reverberation, and high-level background noise.

Most narrow-band sound source localization algorithms are based on estimating the phase difference between sound signals captured by two or more microphones. Many suffer from spatial aliasing problems. The phase differences between a pair of microphones are wrapped beyond the spatial aliasing frequency, meaning that phase differences between different spectral components beyond the aliasing frequency appear indistinguishable from each other. One solution is to adjust the distance between the microphones to obtain a suitable aliasing frequency, and use only spectral components that are below the aliasing frequency for localization. This technique is widely used in localization and beamforming, but since increasing the aliasing frequency requires a smaller distance between the microphones this is achieved at the cost of accuracy. With correct phase unwrapping, a broader frequency band can be utilized for localization because with the phase differences unwrapped, the full frequency band (up to the Nyquist sampling rate) can be used for localization.

One phase unwrapping method is described in "Analysis of the phase unwrapping algorithm," by K. Itoh (Applied Optics, vol. 21(14), pp. 2470, 1982). This algorithm assesses all phase samples along the frequency axis, one by one. If the phase difference between the one sample and the next sample is larger than $\pi$ (or smaller than $-\pi$), the algorithm simply subtracts $2\pi$ from or adds $2\pi$ to all following samples. This method only works for signals with sufficiently low levels of additive noise or other impairments.

SUMMARY

It is an object of the disclosure to provide improved concepts for unwrapping phase differences.

The foregoing and other objects are achieved by the features of the independent claims. Further implementation forms are apparent from the dependent claims, the description and the figures.

According to a first aspect, an apparatus is provided that comprises a processor that is configured to obtain a plurality of phase differences, wherein each phase difference represents a difference in phase between a spectral component in a first sound signal, which is captured by a first microphone, and a corresponding spectral component in a second sound signal, which is captured by a second microphone. The first and second microphones are physically spaced. Each spectral component is part of a signal spectrum for its respective sound signal, and each signal spectrum represents its respective sound signal as a plurality of spectral components that are each comprised in a respective frequency band of a plurality of frequency bands of that sound signal. The processor is configured to estimate an aliasing frequency, wherein phase differences obtained from spectral components that are comprised in frequency bands above the aliasing frequency are expected to be wrapped. It is also configured to unwrap the plurality of phase differences in dependence on the estimated aliasing frequency, wherein a phase difference obtained from spectral components that are comprised in one frequency band is unwrapped independently of any phase difference obtained from spectral components that are comprised in another frequency band. This enables the apparatus to unwrap the phase differences accurately even in noisy environments, because a frequency band that is particularly affected by noise does not affect the unwrapping of phase differences in other frequency bands.

In a first implementation form of the first aspect, the processor may be configured to estimate the aliasing frequency in dependence on phase differences obtained from spectral components in more than three of the plurality of frequency bands that are comprised in the first and second sound signals. This may improve performance by generating a more accurate estimate than what would be obtained with fewer than three frequency bands.

In a second implementation form of the first aspect, the processor in any of the above mentioned implementation forms may be configured to estimate the aliasing frequency in dependence on a fundamental frequency associated with the phase differences obtained from the spectral components that are comprised in the first and second sound signals. This provides a good estimate for the aliasing frequency, which forms a strong basis for unwrapping the phase differences.

In a third implementation form of the first aspect, the processor in any of the above mentioned implementation forms may be configured to estimate the aliasing frequency by auto-correlating phase differences that are obtained from spectral components comprised in more than three of the plurality of frequency bands in the first and second sound signals. It may be configured to identify a maximum or a minimum of that autocorrelation, e.g. by identifying a maximum or minimum of the result matrix output by the auto-correlation process. It may also be configured to estimate the aliasing frequency in dependence on a frequency that is associated with that maximum or minimum. This provides an accurate, efficient technique for estimating the aliasing frequency that is robust to noise as it looks at the phase differences across more than three frequency bands.

In a fourth implementation form of the first aspect, the processor in any of the above mentioned implementation forms may be configured to unwrap the phase difference obtained from spectral components comprised in a particular frequency band by determining the unwrapped phase difference to be:

$$\Phi_i'' = \Phi_i + 2k_d \left\lfloor \frac{N_a + i}{2N_a} \right\rfloor \pi$$

where $\Phi_i''$ is the unwrapped phase difference for frequency band i between a spectral component comprised in the first sound signal that is comprised in frequency band i and a spectral component comprised in the second sound signal that is also comprised in frequency band i, $\Phi_i$ is the measured/observed wrapped phase difference for frequency band i between a spectral component comprised in the first sound signal that is comprised in frequency band i and a spectral component comprised in the second sound signal that is also comprised in frequency band i, $N_a$ is a frequency band corresponding to the estimated aliasing frequency, $k_d$ is an unwrapping direction, and $\lfloor \; \rfloor$ denotes a floor function. This technique is robust to noise as the phase differences for individual frequency bands are unwrapped without reference to the unwrapping of any other frequency band.

In a fifth implementation form of the first aspect, the processor in any of the above mentioned implementation forms may be configured to, before it estimates the aliasing frequency, identify any spectral components in the first and/or second sound signals that are associated with an energy that is below a predetermined threshold and disregard any phase difference that was obtained from the one of the identified spectral components when estimating the aliasing frequency. This improves the accuracy of the subsequent unwrapping.

In a sixth implementation form of the first aspect, the processor in any of the above mentioned implementation forms may be configured to, before it estimates the aliasing frequency, for each spectral component in the first and second sound signals, obtain a covariance matrix that represents the covariance of corresponding spectral components in the first and second sound signals and determine an eigenvalue corresponding to an eigenvector of that matrix. It may also be configured to identify any spectral components in the first and second sound signals that are associated with a covariance matrix that has an eigenvalue that is below a predetermined threshold. It may be configured to disregard any phase difference that was obtained from one of the identified spectral components when estimating the aliasing frequency and determine a replacement phase difference by interpolating between phase differences obtained from spectral components that were identified as having covariance matrices with eigenvalues above the predetermined threshold. It may also be configured to replace a disregarded phase difference with a replacement phase difference. This provides a robust technique for identifying frequency bands that contain too little of the source energy.

In a seventh implementation form of the first aspect, the processor in any of the above mentioned implementation forms may be configured to determine a wrapping direction in dependence on spectral components in more than three of the plurality of frequency bands that are comprised in the first and second sound signals and to unwrap the plurality of phase differences in dependence on that wrapping direction. This provides a technique for estimating the wrapping direction that is robust to noise.

In an eighth implementation form of the first aspect, the processor in any of the above mentioned implementation forms may be configured to determine a wrapping direction for unwrapping a phase difference by assigning each of the plurality of phase differences to one of one or more sets. Each set comprises phase differences obtained from spectral components that are comprised in a particular segment of the plurality of frequency bands of the first and second sound signals. A phase difference may be assigned to one of the sets in dependence on the estimated aliasing frequency, such that none of the phase differences assigned to a particular set is wrapped relative to the other phase differences assigned to the same set. The processor may be configured to fit a line to each set of phase differences. (The line may be fitted exactly to the phase differences in the free field scenario or close to the phase differences in other scenarios). It may also be configured to estimate the wrapping direction in dependence on the slopes of the lines fitted to each set of phase differences. This provides a straightforward technique for estimating the wrapping direction that is not unduly influenced by frequency bands that are suffering from noise.

In a ninth implementation form of the first aspect, the processor of the eighth implementation form may be configured to, before fitting a line to each set of phase differences for estimating the wrapping direction, denoise the phase differences in each set. The processor may be configured to perform this denoising by fitting a line to each set of phase differences. It may be configured to identify any phase differences that should be classified as noise by determining a distance between each phase difference in a respective set and the line fitted to that set and classifying as noise any phase difference that is associated with a distance greater than an adaptive threshold, said adaptive threshold being determined in dependence on a number of phase differences that are respectively above or below the fitted line. It may also be configured to remove any phase differences that are classified as being noise from their respective set. Identifying and removing phase differences that are subject to noise improves the accuracy of the subsequent estimation of the wrapping direction.

In a tenth implementation form of the first aspect, the processor in any of the above mentioned implementation forms may be configured to, after unwrapping the plurality of phase differences, identify any phase difference that has been unwrapped incorrectly or that has (incorrectly) not been unwrapped at all and correct that unwrapped phase difference. The processor may be configured to achieve this by fitting a line to the unwrapped phase differences. It may be configured to identify a phase difference that has been unwrapped incorrectly in dependence on a difference between an unwrapped phase difference obtained from spectral components comprised in a particular frequency band and a phase difference that is predicted for that frequency band by a slope of the line fitted to the unwrapped phase differences. This prevents incorrectly unwrapped phase differences from negatively impacting on any subsequent DOA estimation that is based on the unwrapped phase differences.

In an eleventh implementation form of the first aspect, the processor in any of the above mentioned implementation forms may be configured to determine whether or not the phase differences should be unwrapped by summing the plurality of phase differences to obtain a first sum. It may also be configured to, for each frequency band, determine a difference between an unwrapped phase difference obtained from spectral components comprised in that particular frequency band and a phase difference that is predicted for that frequency band by the slope of the line fitted to the unwrapped phase differences. It may be configured to sum the differences determined for the plurality of frequency bands to obtain a second sum. It may also be configured to determine whether or not the phase differences should not be unwrapped in dependence on a difference between the first sum and the second sum. This improves the overall accuracy by checking whether phase unwrapping is actually required at all.

In a twelfth implementation form of the first aspect, the processor in any of the above mentioned implementation forms may be configured to denoise the unwrapped phase differences by repeatedly fitting a line to the unwrapped phase differences; identifying any unwrapped phase differences that should be classified as noise by determining a distance between each unwrapped phase difference and the fitted line and classifying as noise any unwrapped phase difference that is associated with a distance that is greater than a predetermined threshold; removing any unwrapped phase differences that are classified as noise to form a reduced set of phase differences; and determining an overall error for the reduced set of unwrapped phase differences in dependence on the distance between every unwrapped phase difference in the reduced set and the line. The processor may be configured to repeat the above steps of fitting, identifying, removing and determining with progressively reduced sets of unwrapped phase differences until it obtains a set of unwrapped phase differences for which the overall error is below a predetermined threshold and/or a predetermined percentage of the unwrapped phase differences have been removed. This cleans up any lingering effects of noise on the phase difference vector and improves the accuracy of any subsequent processing—such as DOA estimation—that is performed using the phase difference vector.

In a thirteenth implementation form of the first aspect, the processor in any of the above mentioned implementation forms may be configured to determine a direction of arrival of the sound signal at the first microphone and the second microphone in dependence on the unwrapped phase differences. This enables the apparatus to accurately localize a sound source.

According to a second aspect, a method is provided that comprises obtaining a plurality of phase differences, wherein each phase difference represents a difference in phase between a spectral component in a first sound signal, which is captured by a first microphone, and a corresponding spectral component in a second sound signal, which is captured by a second microphone. Each spectral component is part of a signal spectrum for its respective sound signal, and each signal spectrum represents its respective sound signal as a plurality of spectral components that are each comprised in a respective frequency band of a plurality of frequency bands of that sound signal. The method comprises estimating an aliasing frequency, wherein phase differences obtained from spectral components that are comprised in frequency bands above the aliasing frequency are expected to be wrapped. It also comprises unwrapping the plurality of phase differences in dependence on the estimated aliasing frequency, wherein a phase difference obtained from spectral components that are comprised in one frequency band is unwrapped independently of any phase difference obtained from spectral components that are comprised in another frequency band.

Implementation forms of the second aspect correspond to those of the first aspect.

According to a third aspect, a non-transitory machine readable storage medium is provided that has stored thereon processor executable instructions implementing a method. That method comprises obtaining a plurality of phase differences, wherein each phase difference represents a difference in phase between a spectral component in a sound signal, which is captured by a first microphone, and a corresponding spectral component in a second sound signal, which is captured by a second microphone. Each spectral component is part of a signal spectrum for its respective sound signal, and each signal spectrum representing its respective sound signal as a plurality of spectral components that are each comprised in a respective frequency band of a plurality of frequency bands of that sound signal. The method comprises estimating an aliasing frequency, wherein phase differences obtained from spectral components that are comprised in frequency bands above the aliasing frequency are expected to be wrapped. It also comprises unwrapping the plurality of phase differences in dependence on the estimated aliasing frequency, wherein a phase difference obtained from spectral components that are comprised in one frequency band is unwrapped independently of any phase difference obtained from spectral components that are comprised in another frequency band.

Implementation forms of the third aspect correspond to those of the first or second aspect.

BRIEF DESCRIPTION OF THE DRAWINGS

Embodiments of the present invention will now be described by way of example with reference to the accompanying drawings. In the drawings.

DETAILED DESCRIPTION OF THE EMBODIMENTS

Figure 1:
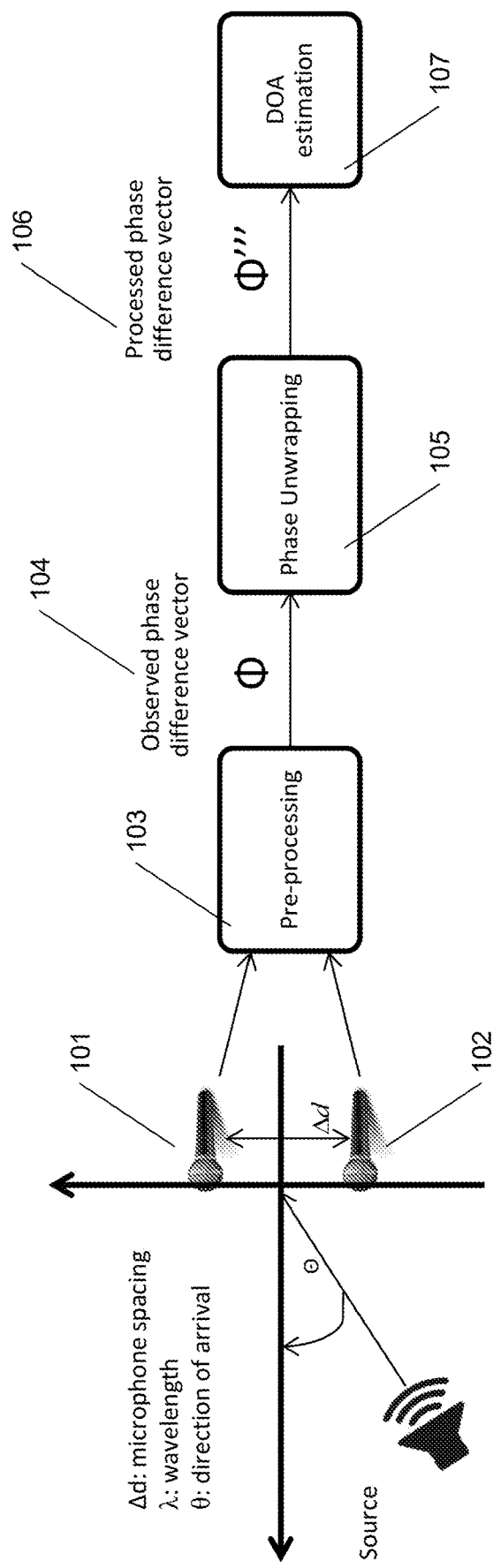
FIG. 1 shows an overview of a system for processing sound signals captured by a dual-microphone arrangement.

A system overview is shown in FIG. 1. A pair of microphones 101, 102 receives a source signal from a particular direction. This is denoted as Direction of Arrival (DOA) θ in FIG. 1. The system in FIG. 1 comprises a pair of microphones but this is for the purposes of example only. The system might comprise any number of microphones, providing there is a minimum of two.

The pre-processing section 103 is configured to receive two sound signals: a first sound signal, which is captured by the first microphone 101, and a second sound signal, which is captured by the second microphone 102. The pre-processing section is preferably configured to generate a phase difference vector Φ (104) from the two sound signals. Any suitable algorithm might be used. One example is MUSIC (see "Multiple emitter location and signal parameter estimation" by R. Schmidt, Antennas Propagation, IEEE Transactions, vol. 34(3), pp. 276-280, 1986.). For implementations with more than 2 microphones, another suitable example is ESPRIT (see "Esprit-estimation of signal parameters via rotational invariance techniques" by R. Roy and T. Kailath, Acoustics, Speech and Signal Processing, IEEE Transactions, 37(7):984-995, July 1989).

Each sound signal can be considered as being formed from a series of complex sinusoidal functions. Each of those sinusoidal functions is a spectral component of the sound signal. Typically, each spectral component is associated with a particular frequency, phase and amplitude. A sound signal can be disassembled into its respective spectral components by a Fourier analysis. The pre-processing section 103 suitably includes a transform unit for decomposing each sound signal into its respective spectral components across a plurality of frequency bins. The transformed version of a sound signal will represent that signal as a series of coefficients, each of which represents an amplitude of the signal in a particular frequency bin.

The pre-processing section 103 is preferably configured to determine the phase differences between corresponding spectral components of the first and second sound signals. Spectral components correspond to one another where they represent the same frequency band in their respective sound signal. In many embodiments, there will be a one-to-one correspondence between frequency bands and frequency bins, so that each frequency band corresponds to a particular frequency bin. In other embodiments, a frequency band might comprise several bins (as explained in more detail below). For example, the pre-processing section might be configured to aggregate the spectral components in several neighbouring bins together before it computes the phase differences, in which case each phase difference will represent a particular frequency band and each frequency band will represent a plurality of frequency bins.

The phase difference vector Φ (104) is provided to a phase unwrapping section 105. The phase unwrapping section is configured to unwrap the phase difference vector by estimating an aliasing frequency, which is described in more detail below. The phase unwrapping section might optionally apply additional post processing steps to output a clean, denoised phase difference vector Φ''' (106) for providing to a DOA estimation section 107.

The issue of spatial aliasing will now be described with reference to the arrangement illustrated in FIG. 1. The spatial aliasing frequency $f_a$ is related to the distance between two microphones $\Delta d$ and θ, where θ is the incident direction of the sound source:

$$f_a = \frac{|\sin\theta|\Delta d}{\pi} \quad (1)$$

In this example, there is assumed to be a one-to-one correspondence between frequency bands and frequency bins. The $n_{th}$ frequency bin at frequency $f_n$ is denoted as n, $n \in [1, \ldots, N]$, and $$f_N = \frac{f_s}{2},$$

where $f_s$ denotes the sampling rate.

The observed phase differences $\phi_n$:

$$\Phi_n = \frac{2\pi f_n |\sin\theta|\Delta d}{c} \mod 2\pi \quad (2)$$

are suitably mapped onto (π, −π].

The estimated phase difference of frequency bin n is denoted $\phi_n$, from which the phase difference vector is formed as Φ, Φ=[Φ$_1$, . . . , Φ$_n$, . . . , Φ$_N$].

Figure 2:
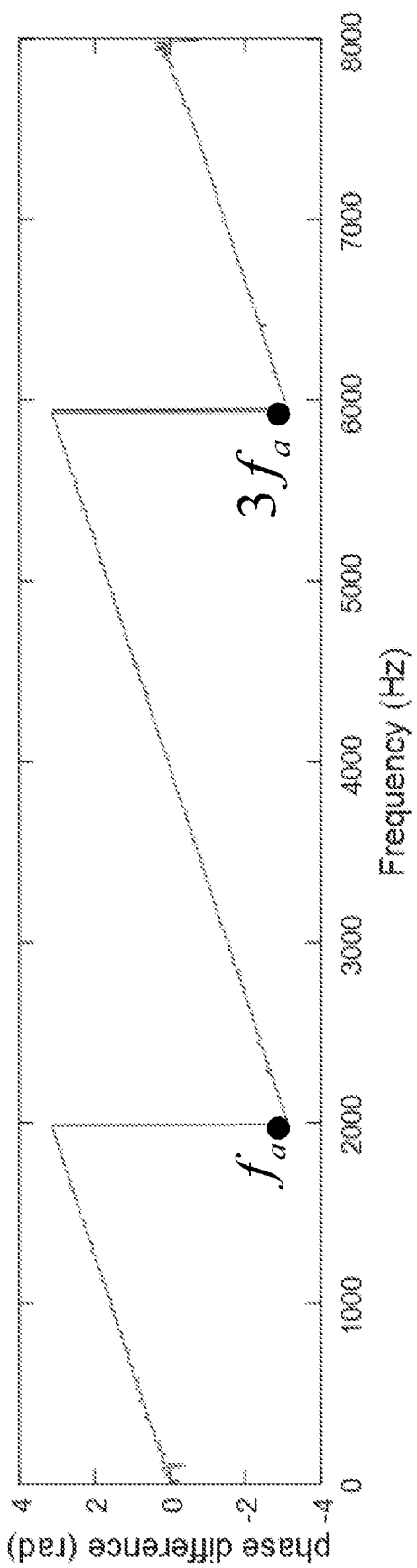
FIG. 2 is a plot of phase difference vs frequency that illustrates wrapping of the phase differences at multiples of an aliasing frequency.

An example of observed Φ (in rad) with the spatial aliasing phenomenon is shown in FIG. 2. FIG. 2 illustrates a specific example in which the target signal is white noise, the DOA θ is 60°; the background is pink and spatially white; the SNR is 20 dB; and the distance between the microphones is 0.1 m for a linear microphone array of 5 microphones. The figure shows that phase wrapping of Φ occurs at $f_a$=2000 Hz and $3f_a$=6000 Hz. It can be seen that above the spatial aliasing frequency there are phase differences between spectral components that are indistinguishable from phase differences between other spectral components that are below the spatial aliasing frequency.

Figure 3:
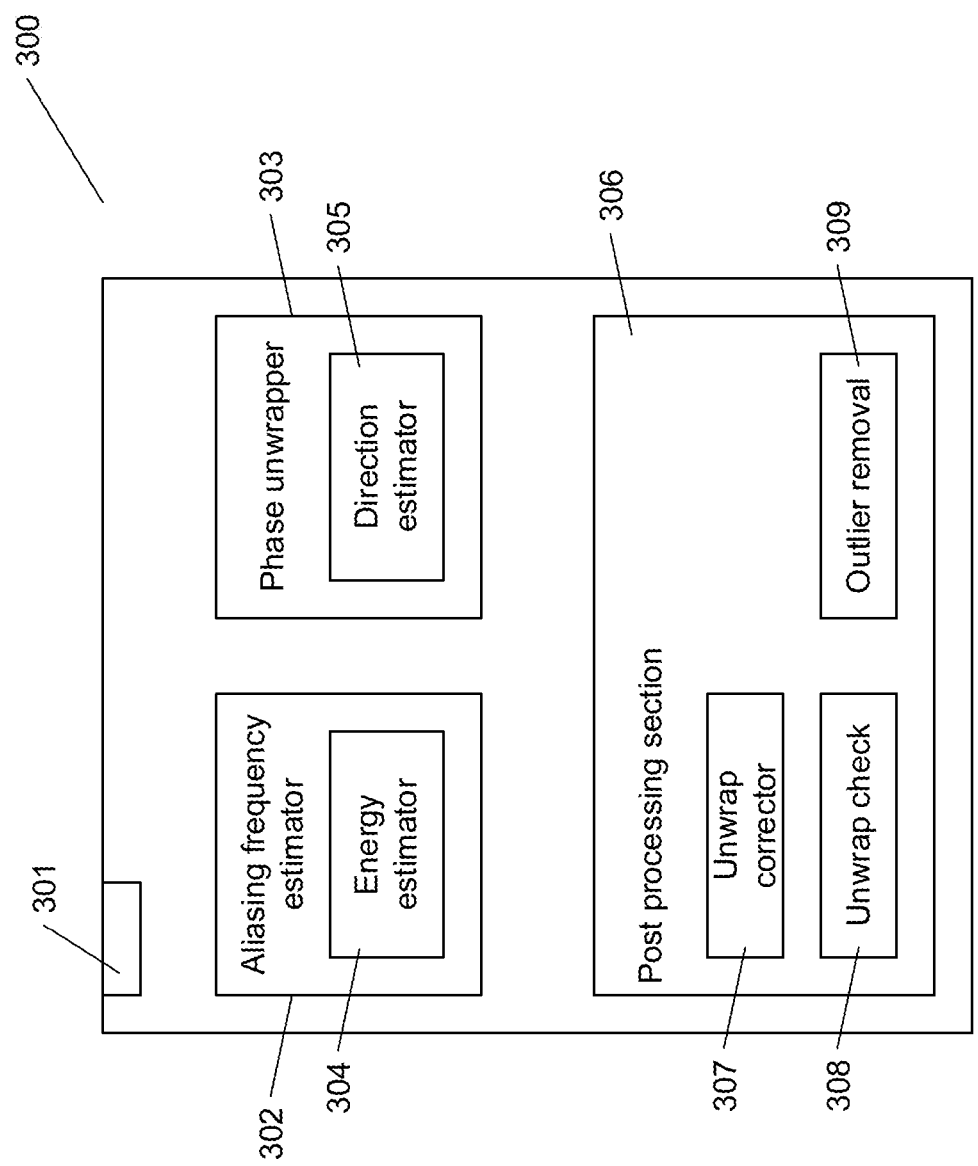
FIG. 3 shows an example of an apparatus according to an embodiment of the invention.
Figure 4:
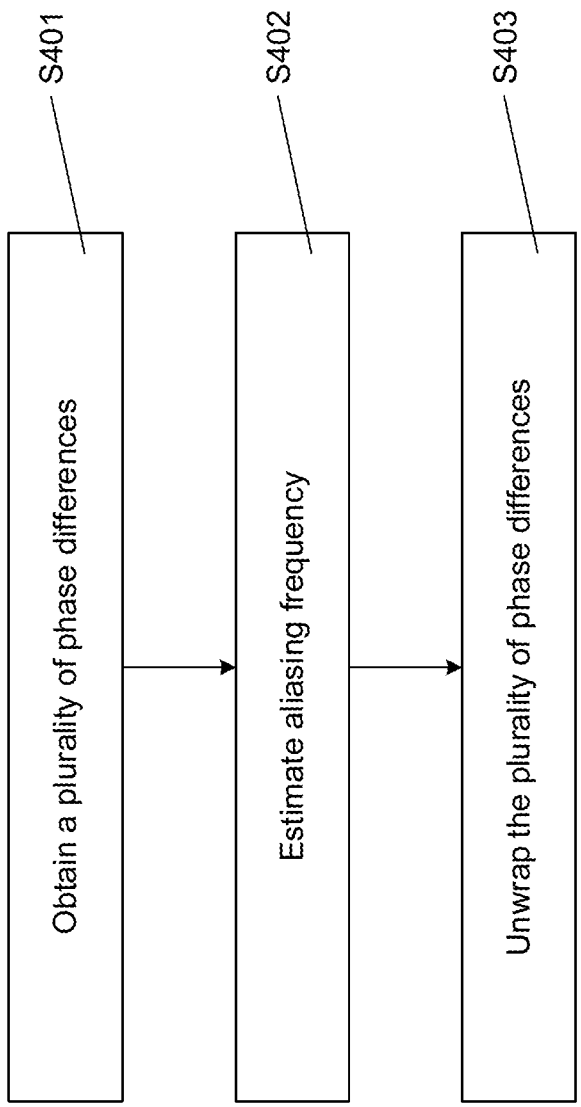
FIG. 4 shows a flowchart of a method for unwrapping phase differences that can be performed by the apparatus of FIG. 3 according to an embodiment of the invention.

An example of an apparatus for implementing the phase unwrapping section 105 is shown in FIG. 3. The apparatus, shown generally at 300, comprises an input 301, a frequency estimator 302 and a phase unwrapper 303. The operation of these different functional units will be described in more detail with reference to FIG. 4, which gives an overview of a process for unwrapping a plurality of phase differences. The apparatus also includes an optional post processing section 306, which will be described in more detail below with reference to FIGS. 5 to 12.

The input 301 is configured to receive a plurality of phase differences (step S401). Those phase differences may be embodied by a vector, such as phase difference vector Φ (104). Each phase difference represents a difference in phase between corresponding spectral components in a first sound signal and a second sound signal. The aliasing frequency estimator (302) is configured to estimate an aliasing frequency (step S402). The aliasing frequency is the frequency above which observed phase differences between the spectral components captured by the microphone arrangement represented by microphones 101,102 are expected to be wrapped. The phase unwrapper (303) is configured to unwrap the plurality of phase differences in dependence on the estimated aliasing frequency (step S403). In particular, the phase unwrapper is configured to estimate the aliasing frequency by analysing the whole phase difference vector, not just the phase differences of lower frequency bands. The phase difference for a spectral component comprised in one particular frequency band can then be unwrapped using just the aliasing frequency. There is no need to refer to the phase difference of a neighbouring frequency band, such as happens in the method described in "Analysis of the phase unwrapping algorithm," by K. Itoh (Applied Optics, vol. 21(14), pp. 2470, 1982).

The independent nature of the unwrapping is described in more detail below, but it should be noted that, as before, each frequency band may correspond to one or more frequency bins. Those bins may be processed separately or together. So, for example, phase differences corresponding to a plurality of different frequency bins in the same frequency band may be aggregated and processed together. The phase unwrapper 303 might unwrap those phase differences together, but in doing so it would unwrap them independently of any aggregated phase differences in any other frequency band.

In many implementations the apparatus is likely to form part of a larger device. That device could be, for example, a mobile phone, smart phone, tablet, laptop, stereo system or any generic user equipment or computing device.

The structures shown in FIG. 1 (and all the block apparatus diagrams included herein) are intended to correspond to a number of functional blocks. This is for illustrative purposes only. FIG. 1 is not intended to define a strict division between different parts of hardware on a chip or between different programs, procedures or functions in software. In some embodiments, some or all of the signal processing techniques described herein are likely to be performed wholly or partly in hardware. This particularly applies to techniques incorporating repetitive operations such as Fourier transforms, linear regressions and summations. In some implementations, at least some of the functional blocks are likely to be implemented wholly or partly by a processor acting under software control. Any such software is suitably stored on a non-transitory machine readable storage medium. The processor could, for example, be a DSP of a mobile phone, smart phone, stereo system or any generic user equipment or generic computing device.

Figure 5:
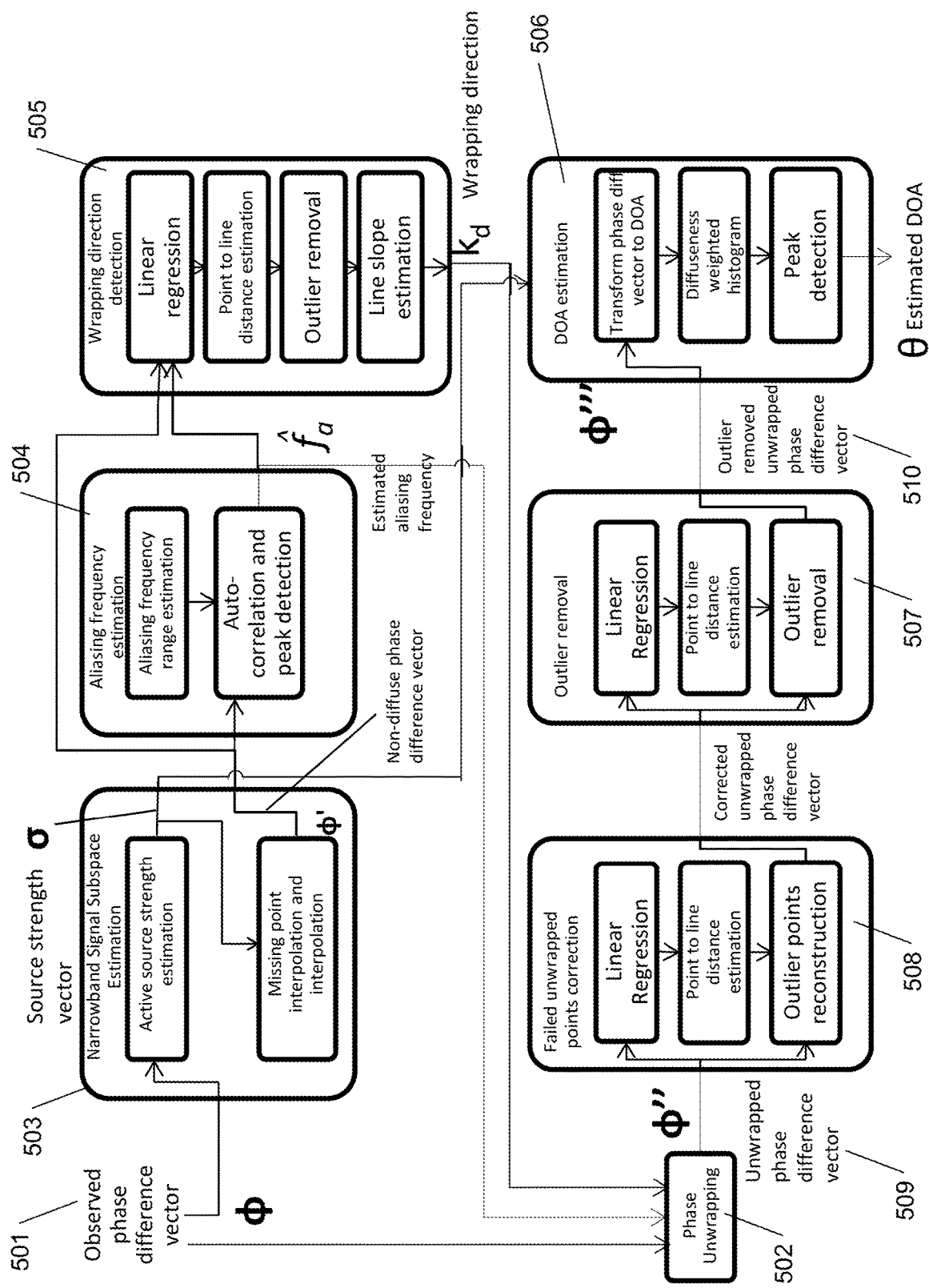
FIG. 5 shows in more detail how phase differences can be unwrapped according to an embodiment of the invention.

A more detailed embodiment is shown in FIG. 5. This embodiment includes the processes of receiving the observed phase difference vector (501), estimating the aliasing frequency (504) and phase unwrapping (502). It also includes some optional pre- and post-processing techniques that help to improve performance. For example, in the pre-processing section, the apparatus estimates the target source strength of the observed phase difference vector Φ, so that some frequency bands can be removed to achieve better analysis (503). Then the aliasing frequency $f_a$ and wrapping direction are estimated (504, 505). The wrapping direction defines whether π has to be added or subtracted for unwrapping. Based on these estimates, the apparatus can carry out phase unwrapping (502). Suitably each of these processes is performed directly on the whole frequency range of the sound signals. This is different from existing techniques in which unwrapping is performed sequentially by just comparing one frequency band with its immediate neighbours.

Theoretically, after phase unwrapping, the unwrapped phase difference vector Φ" (509) should be close to a straight line. This assumes that the source signal propagates in a free noise field, which will not be the case in practice. In order to mitigate the effects of noise, the optional post-processing section 306 applies failed unwrapped points correction (508) and outlier removal (509). Some incorrect unwrappings or failed unwrapped points are inevitable with noisy signals and a fixed estimate of the aliasing frequency. By implementing unwrapped points correction, the apparatus helps to correct these errors by adding some extra statistical processing to achieve further accuracy improvements. Other post-processing techniques include outlier removal and using a diffuseness-weighted histogram in DOA (506) also improve the performance and make the algorithm more robust. In the final step, the outlier removed, unwrapped phase difference vector Φ''' 510 is converted into a DOA.

Each of the techniques outlined in FIG. 5 is described in more detail below.

Narrowband Signal Subspace Estimation

Figure 6:
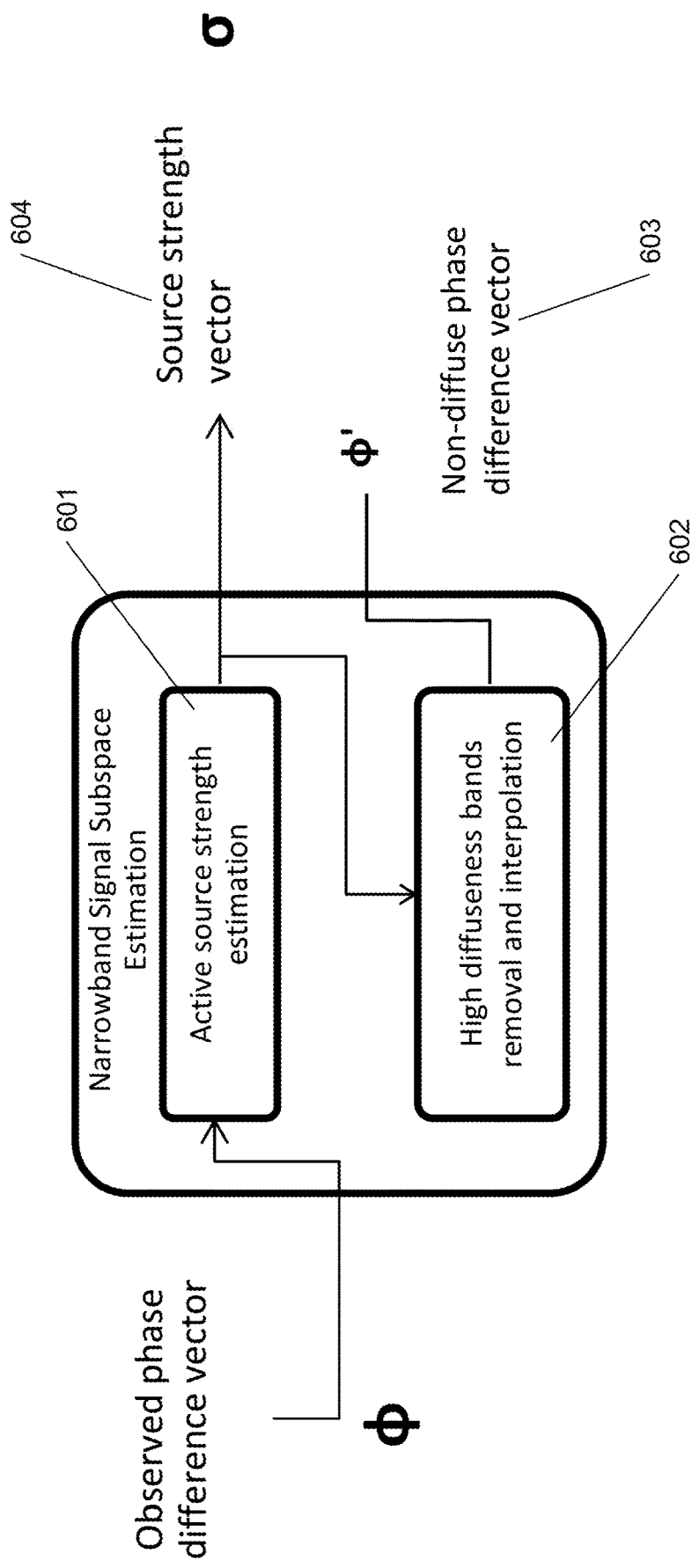
FIG. 6 shows how a narrowband signal subspace estimation can be used to mitigate the effect of noise on the phase difference vector according to an embodiment of the invention.

FIG. 6 shows an overview of a technique for narrowband signal subspace estimation. An aim of this technique is to remove subbands that contain too little of the source subspace energy, and are thus unusable for localization, from the subsequent processing steps. The aliasing frequency estimator 302 in apparatus 300 may optionally incorporate an energy estimator (304) that is configured to achieve this aim by first identifying which frequency bands in the first and/or second sounds signals have too little of the source energy (601) and then removing those frequency bands from consideration (602).

For a use case that involves a single sound source in diffuse background noise, a relatively simple technique can be employed to identify relevant frequency bands (601). First, the energy estimator (304) may be configured to obtain a covariance matrix that represents the covariance of corresponding spectral components in the first and second sound signals. The energy estimator then determines the eigenvectors and corresponding eigenvalues of the covariance matrix for each respective frequency band. The eigenvalues may be normalized. Here $\sigma_i$ denotes the normalized largest eigenvalue for the $i_{th}$ frequency band, as an element of the normalized target source strength vector $\sigma=[\sigma_1, \ldots, \sigma_i, \ldots, \sigma_N]$ (604). The energy estimator is then configured to identify any frequency bands for which the corresponding eigenvalue is below a predetermined threshold. A threshold $\tau_d$ is set, and it is decided that, if $\sigma_i < \tau_d$, the spectral components in the $i_{th}$ frequency band are too weak and thus not relevant for localization. Another option is to use a more sophisticated method for noise threshold estimation, instead of using a simple fixed threshold. For example, minimum statistics could be used.

The apparatus 300 is configured to disregard any phase difference obtained from one of the spectral components that are identified as being too weak. After removing the phase differences corresponding to the identified frequency bands, the energy estimator (304) is preferably configured to replace any removed phase differences with new, interpolated phase differences generated via linear interpolation between the phase differences that remain (i.e. the phase differences obtained from spectral components in frequency bands that had an eigenvalue above the predetermined threshold). The result is the so-called non-diffuse phase difference vector (603).

This step of narrowband signal subspace estimation can improve the accuracy of aliasing frequency estimation when the source is lacking excitation energy at certain frequencies.

Aliasing Frequency Estimation

Figure 7:
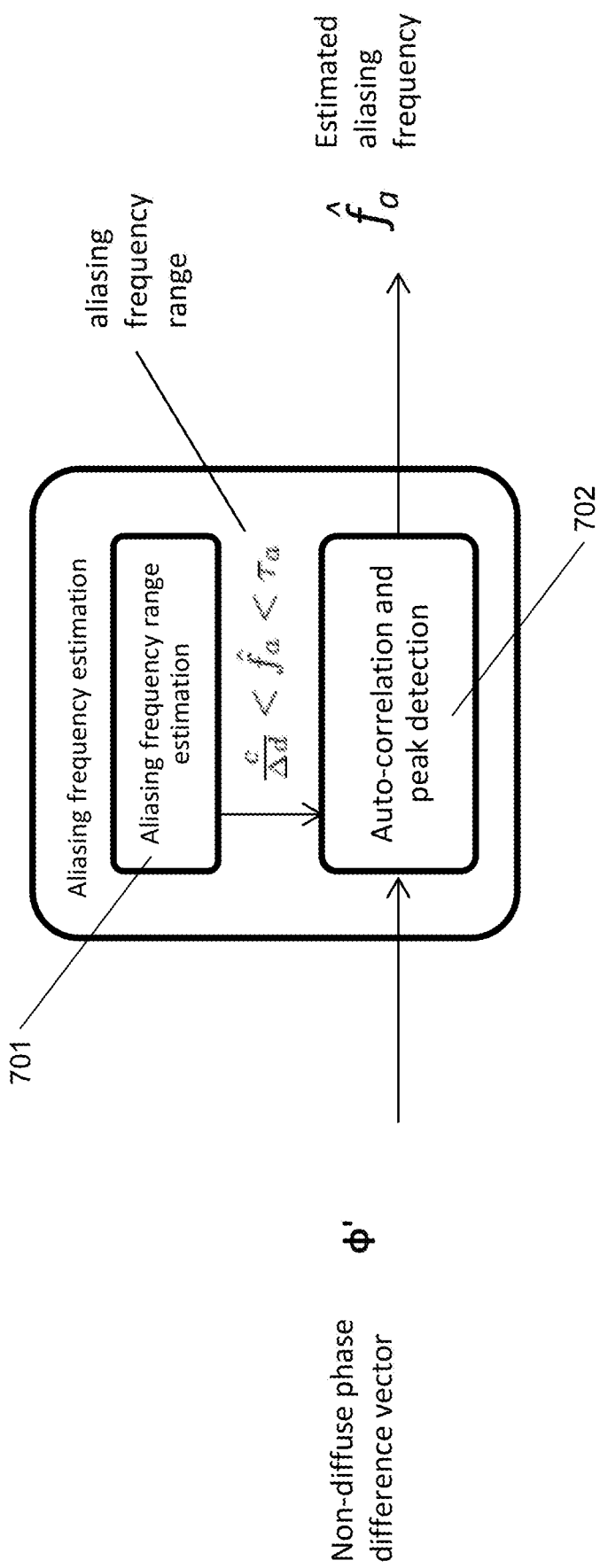
FIG. 7 shows how an aliasing frequency can be estimated according to an embodiment of the invention.

FIG. 7 shows an overview of a technique for aliasing frequency estimation. As mentioned above, existing unwrapping techniques compare the phase difference for one frequency band with those for its neighbouring frequency bands. This is not optimal for noisy environments in which noise can affect some frequency bands particularly badly and consequently cause phase differences in neighbouring bands to be incorrectly unwrapped. The apparatus 300 is preferably configured to estimate the aliasing frequency by simultaneously analysing phase differences across more frequency bands than those that are just immediate neighbours. In practice, this means that the apparatus analyses the phase differences for more than three frequency bands, and up to all of the frequency bands in the first and second sound signals.

The frequency estimator 302 may be configured to estimate the aliasing frequency in dependence on a fundamental frequency that is associated with the phase differences in observed phase difference vector 104. One possible technique for estimating this fundamental frequency is based on auto-correlating the phase differences, as explained in more detail below.

As a first step, the frequency estimator (302) is configured to determine a possible range of the aliasing frequency $\hat{f}_a$, to preclude large errors (701). From Equation 2 above, it can be seen that when $\Delta d$ is fixed, the minimum aliasing frequency can be found by:

$$\min f_a = \frac{c}{\Delta d}.$$

The aim of the techniques described herein is not to necessarily estimate the aliasing frequency perfectly, but to unwrap any wrapped phase observations. Thus, given that the post-processing section (specifically failed unwrapped points reconstruction) should unwrap any phase differences that have failed to unwrap, it is not necessarily a problem if not all of the phase differences are unwrapped in the initial unwrapping phase. It has been found that empirically the post-processing algorithm performs well as long as the number of wrapped phase observations remains below a certain threshold. It has been estimated that the acceptable limits to the aliasing frequency estimation is in the range $$\frac{c}{\Delta d} < \hat{f}_a < \tau_a f_N, \tau_a \in [0.5, 1].$$

The frequency estimator (302) may be configured to auto-correlate phase differences that are obtained from spectral components comprised in more than three of the plurality of frequency bands in the first and second sound signals. In practice, if all of the frequency bands are used, this step applies an auto-correlation to $\Phi'$. The resulting vector is denoted as $R_\Phi$. $R_\Phi$ is symmetrical, so the frequency estimator may only consider half of it. The frequency estimator then identifies a maximum or a minimum of that autocorrelation, and estimates the aliasing frequency in dependence on a frequency associated with that maximum or minimum (702).

Theoretically, if the vector $\Phi'$ is wrapped, the peak of vector $R_\Phi$ is at 0 on the x-axis. The second peak is at the position of $2f_a$, and the minimum is at $f_a$. The positions of these points are periodical (as shown in FIG. 2). When $f_a$ is in the range of $$\left[\frac{f_N}{2}, f_N\right],$$

$R_\Phi$ does not show a full period, so the frequency estimator detects the minimum (rather than the peak) and uses it as an estimate for the aliasing frequency $\hat{f}_a$. When $$f_a > \frac{f_s}{2},$$

there is no phase wrapping and the minimum of the auto-correlation of $\Phi'$ and $\hat{f}_a$ are not meaningful. Whether or not $\hat{f}_a$ is useful is determined as described below in the section on "failed unwrapped points correction". If $\hat{f}_a$ is not meaningful, the steps of phase unwrapping are preferably not performed, but only the step of removing outliers for denoising (see below).

Wrapping Direction Estimation

Figure 8:
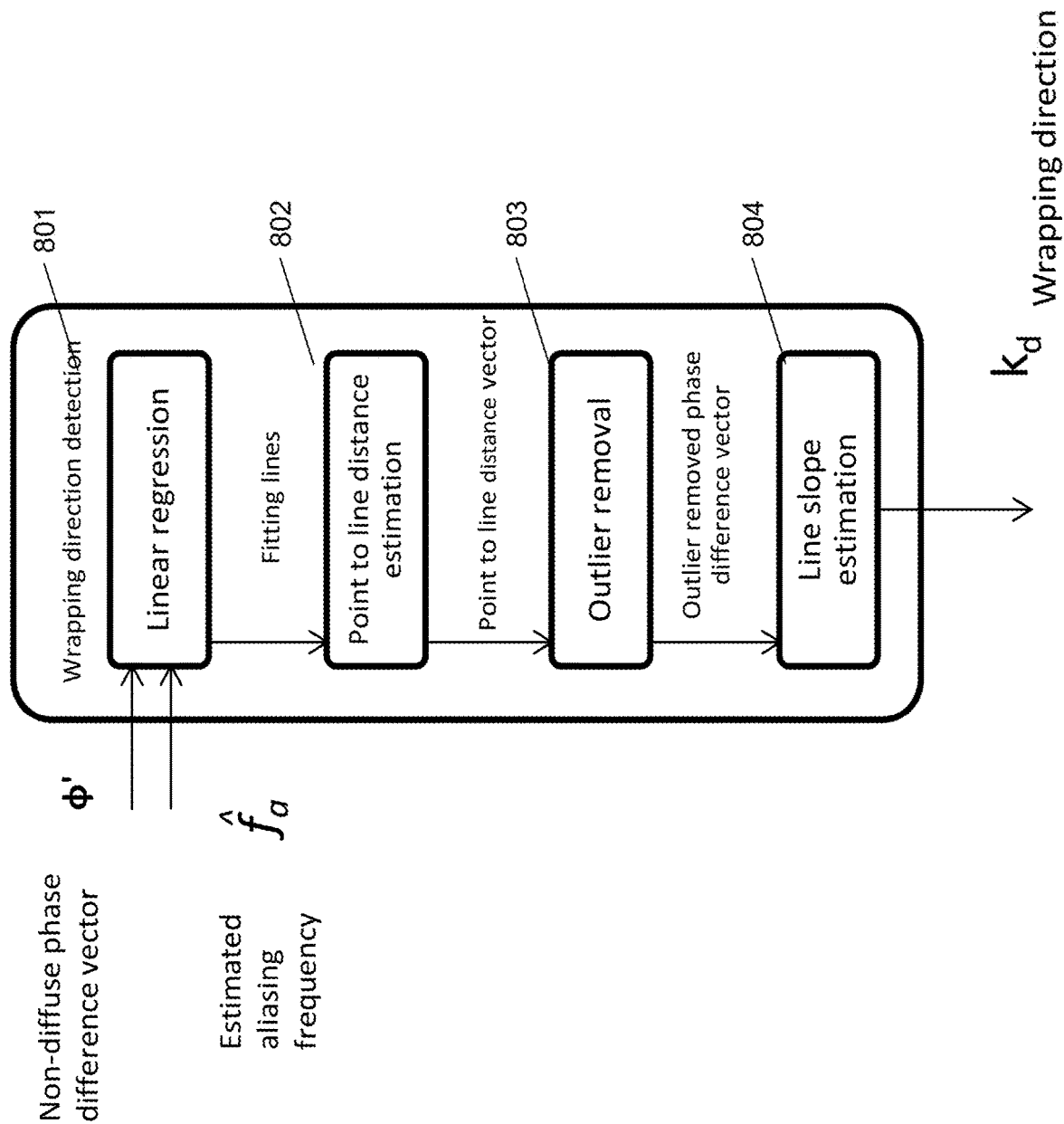
FIG. 8 shows how a wrapping direction can be detected according to an embodiment of the invention.

Before $\Phi$ is unwrapped, apparatus 300 preferably determines in which direction it should be unwrapped, i.e. whether $\pi$ should be added or subtracted. There is one wrapping direction for all of the spectral components. FIG. 8 shows an overview of a technique for estimating the wrapping direction. The phase unwrapper 303 in apparatus 300 may optionally incorporate a direction estimator (305) that is configured to perform this technique.

First, as before, the direction estimator (305) is preferably configured to determine the wrapping direction based on more than three of the spectral components that are comprised in the first and second sound signals. Second, the direction estimator may be configured to estimate the wrapping direction using linear regression or another simple method, but this is not suitable when the phase is wrapped with $$f_a < \frac{f_s}{2}$$

and noisy. Therefore, a preferred technique is for the direction estimator to initially denoise the phase difference vector before it determines the wrapping direction.

The direction estimator (305) initially assigns each of the plurality of phase differences to one of one or more sets. Each set comprises phase differences for a particular segment of the frequency bands in the first and second sound signals. In one example, two segments from $\Phi'$ are extracted; the first one is from 0 Hz to the estimated aliasing frequency $\hat{f}_a$ (at frequency bin $$N_a = \frac{N\hat{f}_a}{f_s}),$$

and the second one is from $N_a$ to $3N_a$. Thus none of the phase differences in a particular segment is wrapped relative to the other phase differences in that segment. In order to improve the robustness to errors in the estimation of $\hat{f}_a$, the limitation of the frequency bin ranges of the segments is set to $[0, 0.75N_a]$ and $[1.4N_a, 2.6N_a]$, respectively. Then the two segments are denoised, using the same process on each segment. An example of the process on the first segment is described below.

First, direction estimator (305) fits a line to each set of phase differences (801). Preferably this is a line of best fit, which may be determined using linear regression. The fitting line can be expressed as:

$$\phi_i' = ki + b \quad (b=0 \text{ for } i < N_a) \tag{3}$$

The direction estimator then determines a distance between each phase difference and the line fitted to its set (802). For example, the vertical distance $d_i$ of the $i_{th}$ point to the corresponding fitting line may be computed:

$$d_i = \Phi_i' - \phi_i' \tag{4}$$

The direction estimator may be configured to classify as noise any phase difference that is associated with a distance greater than an adaptive threshold. For example, it may be configured to consider that a point is noise and should be removed if:

$$\frac{\text{card}\{d_i \mid d_i > 0\}}{N_a d_i} < \tau_o \text{ if } d_i > 0 \tag{5}$$

$$\frac{\text{card}\{d_i \mid d_i \le 0\}}{N_a d_i} < \tau_o \text{ if } d_i \le 0$$

$$\tau_o \in (0, 1)$$

where card{ } denotes cardinality measure.

Thus, in this example, the adaptive threshold is determined by the number of phase differences that are respectively above or below the fitted line. The direction estimator can then remove any phase differences that are classified as being noise from their respective set (803).

The direction estimator (305) is then able to determine the wrapping direction in dependence on the slope of the lines fitted to the denoised sets of phase differences (804). This may be achieved by applying the linear regression again, but this time to each denoised segment. The resulting slopes can be denoted $k_1$ and $k_2$. The averaged distance deviation is computed for both segments, which can be denoted as $v_1$ and $v_2$. The length of the segments can be denoted as $l_1$ and $l_2$. The wrapping direction $k_d$ is then estimated by the sign of $k_1 f(v_1,l_1)+k_2 f(v_2,l_2)$, where f(v,l) defines a weighting function. In other words, $k_d=\pm 1$. In one example the weighting function may be $$f(l, v) = \frac{l}{v^2}.$$

Phase Unwrapping

Figure 9:
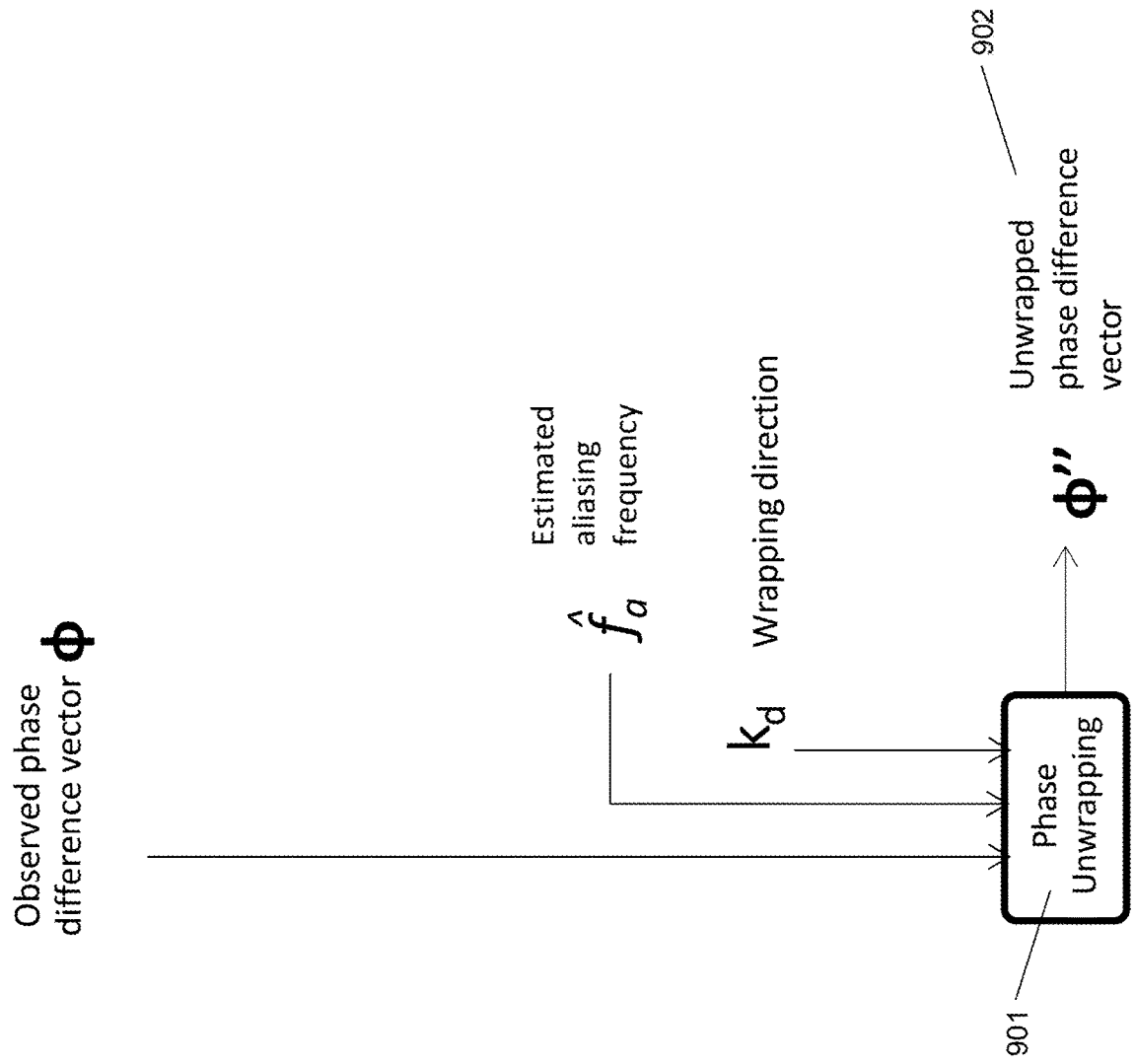
FIG. 9 shows how a wrapped phase difference can be unwrapped according to an embodiment of the invention.

FIG. 9 shows an overview of a technique for unwrapping the phase differences. The phase unwrapper 303 may be configured to obtain the unwrapped phase difference vector (902) $\Phi''=[\Phi_1'',\Phi_2'',\ldots,\Phi_i'',\ldots,\Phi_N'']$ (901) using:

$$\Phi_i'' = \Phi_i + 2k_d \left\lfloor \frac{N_a + i}{2N_a} \right\rfloor \pi \tag{6}$$

where $\Phi_i''$ is the unwrapped phase difference for frequency band i between a spectral component in the first sound signal that is comprised in frequency band i and a spectral component comprised in the second sound signal that is also comprised in frequency band i, $\Phi_i$ is the wrapped phase difference for frequency bin i between a spectral component in the first sound signal that is comprised in frequency band i and a spectral component in the second sound signal that is also comprised in frequency band i, $N_a$ is a frequency band corresponding to the estimated aliasing frequency, $k_d$ is a unwrapping direction, and ⌊ ⌋ denotes a floor function.

Failed Unwrapped Points Correction

Figure 10:
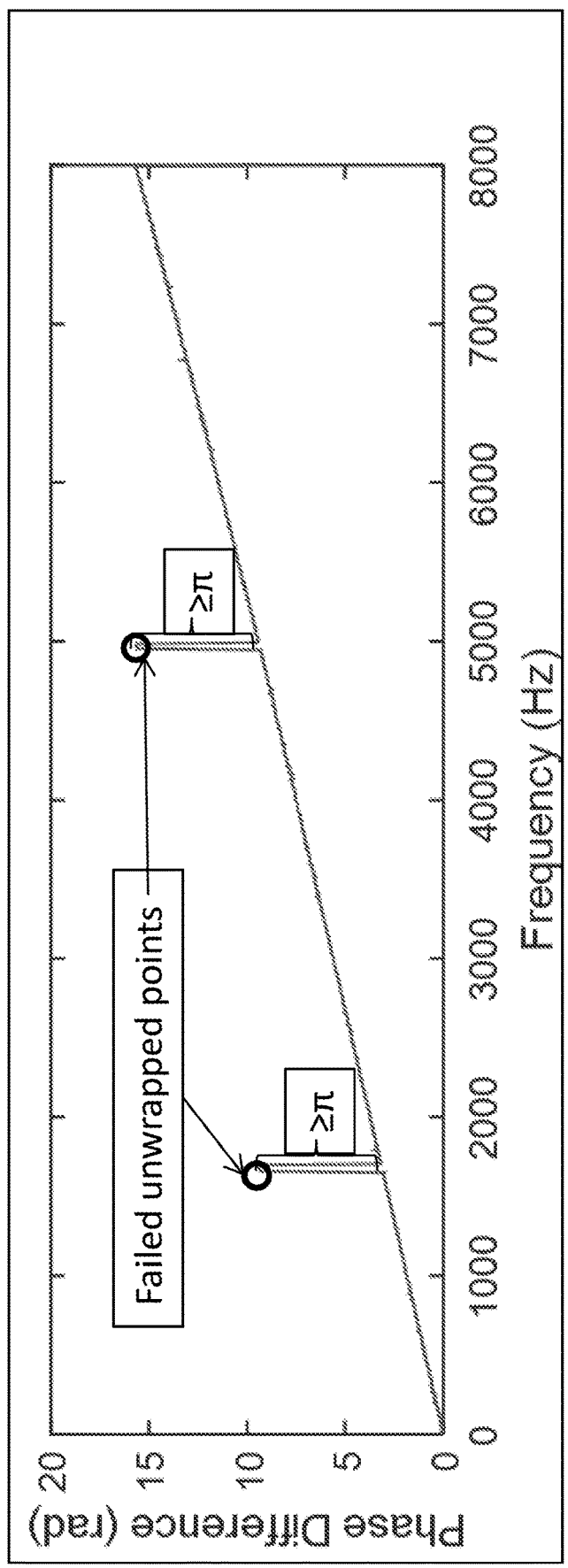
FIG. 10 shows an example of phase differences that have been incorrectly unwrapped.

The apparatus 300 includes an optional post-processing section (306) for further improving the accuracy of the phase unwrapping. An example of phase differences that have failed to unwrap is shown in FIG. 10. Preferably the post-processing section includes an unwrap corrector 307 for unwrapping phase differences such as these.

Figure 11:
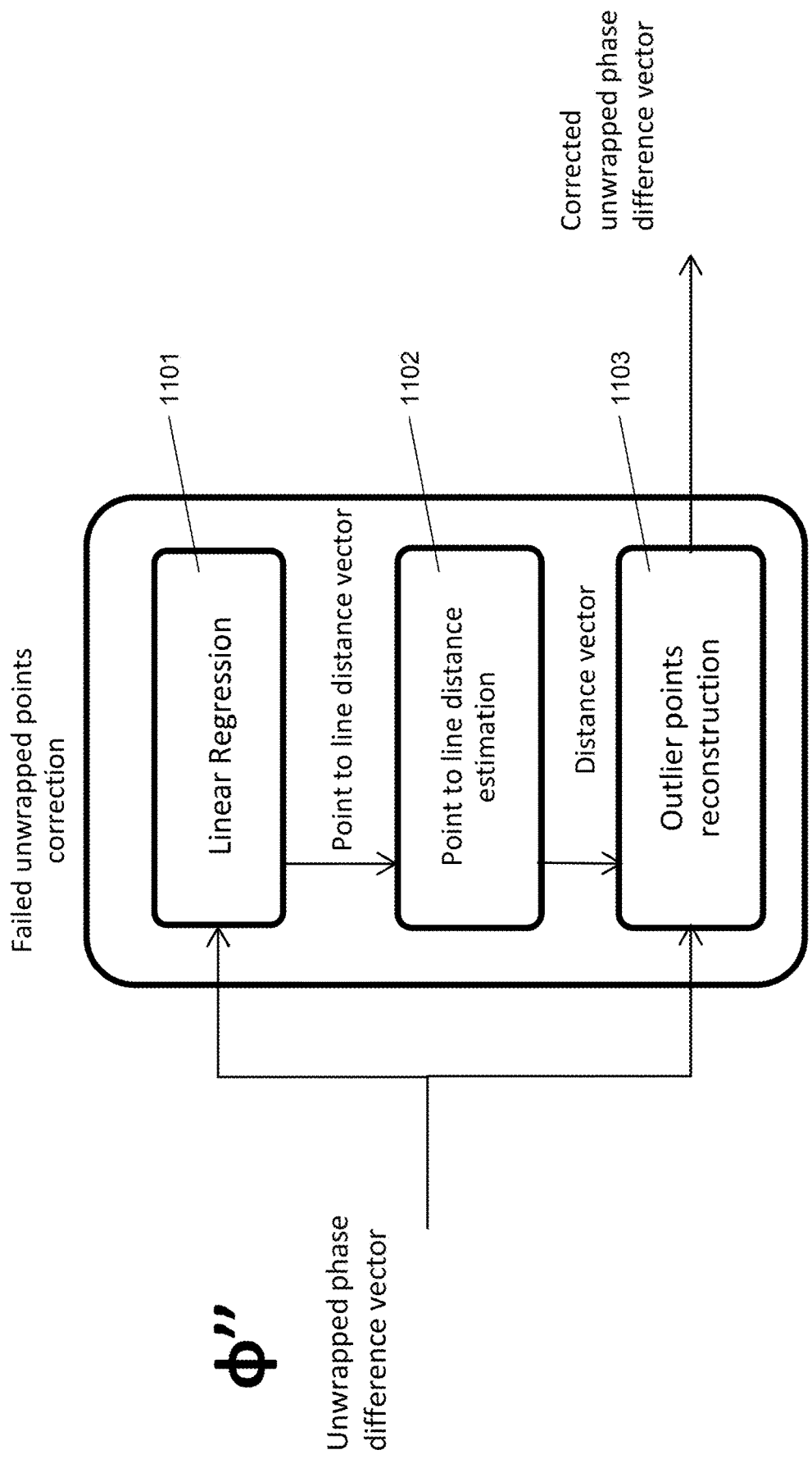
FIG. 11 shows how phase differences that have been incorrectly unwrapped can be detected and corrected according to an embodiment of the invention.

FIG. 11 shows an overview of a technique for correcting phase differences that have failed to unwrap. This technique is simple but very efficient. The failed unwrapped points detection is similar to denoising, in that a line is fitted to the unwrapped phase differences (e.g. by finding the best fitting line for $\Phi''$) (1101). $k_d$ is denoted as the sign of the slope of the fitting line. The failed unwrapped points are corrected by:

$$\Phi_i''=\Phi_i''+\text{sign}(\Phi_i''-k_d i)2\pi, \tag{7}$$

if $|\Phi_i''-k_d i|>2\pi$ where $k_d=\pm 1$ as before.

So outlying phase differences are essentially first identified in dependence on a phase difference that is predicted for that frequency band by a slope of the line fitted to the unwrapped phase differences. If the actual phase difference is greater than $2\pi$ away from that prediction, it is classified as having been unwrapped incorrectly (1102) and is corrected by either adding or subtracting $2\pi$, as appropriate (1103). Correcting rather than removing the outlier points is helpful because those points may still carry useful information.

The post-processing section (306) also may also include an unwrap checker 308 for confirming whether it is necessary to do phase unwrapping at all. This may be checked by determining a difference between an unwrapped phase difference obtained from spectral components comprised in that particular frequency band and a phase difference that is predicted for that frequency band by k, the slope of the line fitted to the unwrapped phase differences. If a sum of these differences is greater than the sum of actual phase differences, unwrapping is deemed to be unnecessary. This can be expressed as:

$$C = \sum_{i=1}^{N} |\Phi_i| - \tau_c \sum_{i=1}^{N} |\hat{\Phi}_i'' - k_d i| \tag{8}$$

Where k denotes the slope of the fitting line, and $\tau_c$ denotes a constant parameter. If C>0, it is assumed what the previous steps did was correct and the next steps continue with $\hat{\Phi}''$. Otherwise unwrapping is deemed to be unnecessary and the observed phase difference vector $\Phi$ is used for DOA estimation. This helps to avoid large errors in the case of small DOA (signal arriving from the front), when $f_a$ is close to $$\frac{f_s}{2}.$$

Outlier Removal for Denoising

Figure 12:
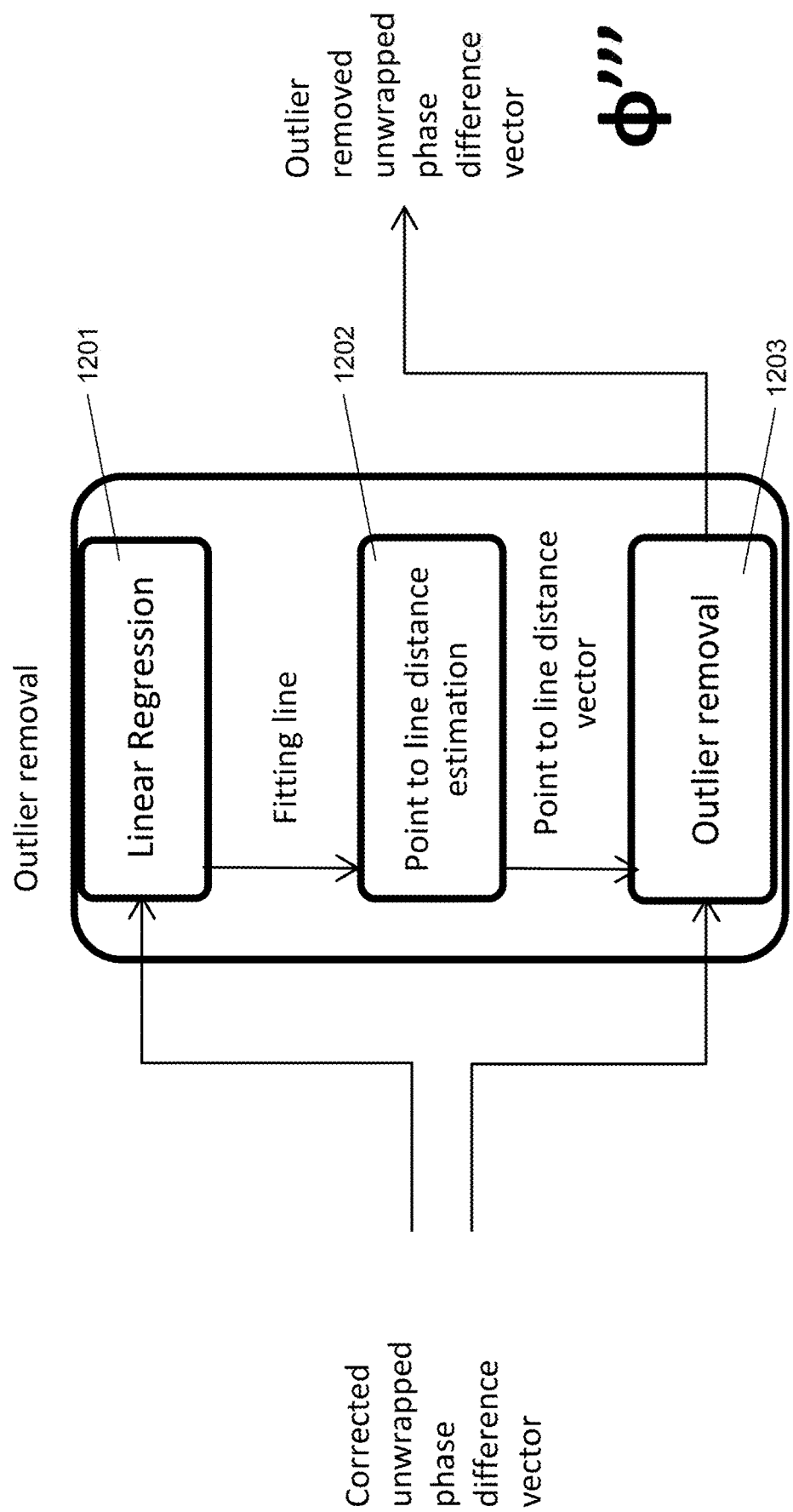
FIG. 12 shows how outliers can be removed from the phase difference vector according to an embodiment of the invention.

The post-processing section (306) may also include an outlier remover (309) for further improving the accuracy of the phase unwrapping. FIG. 12 shows an overview of a technique for removing outliers, which in essence is largely identical to the process described for removing outliers as part of estimating the wrapping direction.

The outlier remover may be configured to fit a line to the unwrapped phase differences (1201) and identify any unwrapped phase differences that should be classified as noise by determining a distance between each unwrapped phase difference and the fitted line (1202). Suitably it classifies as noise any unwrapped phase difference that is associated with a distance that is greater than a predetermined threshold $\tau_k$. All points for which the distance is higher than the threshold are removed from $\hat{\Phi}''$ (1203). The outlier remover is preferably configured to repeat this process of detecting and removing outliers until either an error is sufficiently small or up to 50% of the corrected unwrapped phase differences 1204 have been removed. The error may be estimated by summing the distances between all of the remaining set of phase differences and the fitted line, divided by the number of those phase differences. The error may be considered sufficiently small if the averaged distance is less than $\tau_o$ ($\tau_o > 0$).

Figure 13:
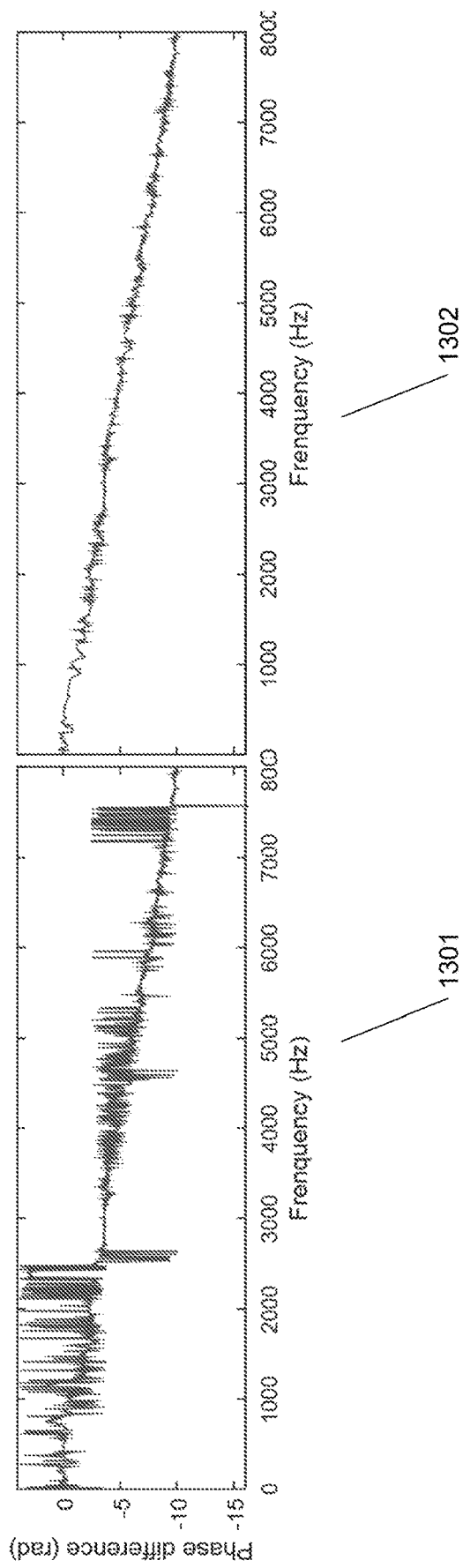
FIG. 13 shows plots of a phase difference vector before and after failed unwrapping points reconstruction and outlier removal denoising.

FIG. 13 shows an example before (1301) and after (1302) failed unwrapping points reconstruction and outlier removal denoising. The result of this step is denoted as $\Phi'''$. It is assumed that this result is clean.

From Processed Phase Difference Vector to DOA

The unwrapped phase differences can be used to determine a direction of arrival of the sound signals at the first microphone and the second microphone. Any appropriate method might be used to transform $\Phi'''$ into a DOA. One possible example is the ESPRIT algorithm (see "Esprit-estimation of signal parameters via rotational invariance techniques" by R. Roy and T. Kailath, Acoustics, Speech and Signal Processing, IEEE Transactions, 37(7):984-995, July 1989). This algorithm computes the histogram of the DOA, weighted by the target source strength vector $\sigma$. After applying a first order moving average filter to the histogram, the final estimated DOA is given by the location of the highest peak.

The embodiments described above have been implemented in one practical example using a uniform linear microphone array with 5 omni-directional microphones for capturing the sound signals. The parameters that are selected can affect robustness. For a real-time application, a sampling rate of 16000 kHz, window size of 0.2 s, hop size of 0.1 s and an FFT length of 4096 are recommended. The suggested thresholds and parameters are:

$$[\tau_d, \tau_a, \tau_k, \tau_c, \tau_o] = [0.3\ 0.37\ 0.75\ 1\ 0.5],\ \text{and}\ f(l, v) = \frac{l}{v^2}.$$

Figure 14:
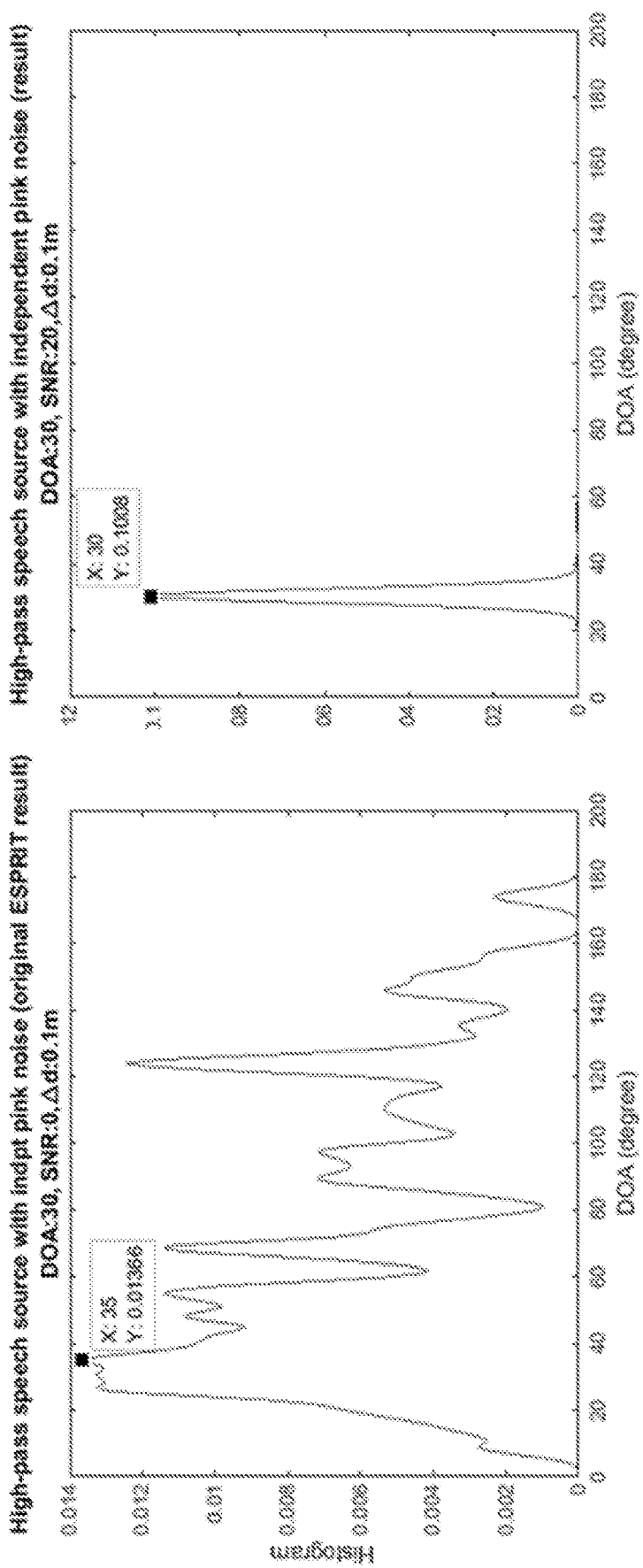
FIG. 14 shows results obtained by applying a localization algorithm to phase differences unwrapped using a pre-existing method and using a method according to an embodiment of the invention.

FIG. 14 shows the results obtained by the same localization algorithm (ESPRIT) using the same captured sound signals. The left-hand graph shows the results without using any of the techniques described herein whereas the right-hand graph shows the results with using the techniques described herein. The results are shown as a histogram of DOA estimates obtained from the estimates of different frequency bands for one frame of the sound signals. In this scenario, a speech signal with a high-pass filter is the target source and 0 dB SNR spatially white pink noise is added to each recording channel. The ground truth DOA of the target source is 30°. It can be seen that without the post processing, the peak is ambiguously unclear and the error is 5°. A typical method of dealing with such ambiguity would be to apply a more robust peak detection algorithm, e.g. an algorithm that considers that the narrower a peak, the higher prominence it should be given. Using this kind of peak detection algorithm, the peak at 122° might be chosen, which would give an error of 92°. By applying the techniques described above, the peak is clear enough for any peak detection algorithm and the error is 0°. This confirms that the techniques described herein are robust to noise.

Experiments have confirmed that the algorithm works in a scenario with a single point sound source and high-level non-stationary acoustical background noise. The method improves the localization robustness by utilizing a wider frequency range. There are many real-life scenarios in which the embodiments described above can be beneficially implemented, including localizing speech signals in cars with high-level engine noise, or in offices with servers, air conditioning units and printer noise.

It should be understood that where this explanation and the accompanying claims refer to the device doing something by performing certain steps or procedures or by implementing particular techniques that does not preclude the device from performing other steps or procedures or implementing other techniques as part of the same process. In other words, where the device is described as doing something "by" certain specified means, the word "by" is meant in the sense of the device performing a process "comprising" the specified means rather than "consisting of" them.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of embodiments of the present invention may consist of any such individual feature or combination of features. In view of the foregoing description it will be evident to a person skilled in the art that various modifications may be made within the scope of the invention.

What is claimed is:

1. An apparatus comprising a processor that is configured to:
   obtain a plurality of phase differences, wherein each phase difference represents a difference in phase between (i) a spectral component in a first sound signal captured by a first microphone, and (ii) a spectral component in a second sound signal captured by a second microphone,
      wherein each spectral component is part of a signal spectrum for its respective sound signal,
      wherein each signal spectrum represents its respective sound signal as a plurality of spectral components, and
      wherein each spectral component is comprised in a respective frequency band of a plurality of frequency bands representing the respective sound signal;
   estimate an aliasing frequency; and
   unwrap the plurality of phase differences in dependence on the estimated aliasing frequency, including determining a wrapping direction for unwrapping each phase difference by assigning each phase difference to one of one or more sets, wherein:
      (a) each set comprises phase differences obtained from spectral components that are comprised in a particular segment of the plurality of frequency bands of the first and second sound signals; and
      (b) each phase difference is assigned to one of the sets in dependence on the estimated aliasing frequency, such that none of the phase differences assigned to a particular set is wrapped relative to the other phase differences assigned to the same set;
   fit a line to each set of phase differences; and
   estimate the wrapping direction in dependence on slopes of the lines fitted to the sets of phase differences,
      wherein each phase difference obtained from spectral components that are comprised in one frequency band is unwrapped independently of any phase difference obtained from spectral components that are comprised in another frequency band.

2. The apparatus as claimed in claim 1, wherein the phase differences are obtained from spectral components in more than three of the plurality of frequency bands that are comprised in the first and second sound signals.

3. The apparatus as claimed in claim 1, wherein the processor is further configured to estimate the aliasing frequency in dependence on a fundamental frequency associated with the phase differences obtained from the spectral components that are comprised in the first and second sound signals.

4. The apparatus as claimed in claim 1, wherein the processor is further configured to unwrap the phase difference obtained from spectral components comprised in a particular frequency band by determining the unwrapped phase difference to be:

$$\Phi_i'' = \Phi_i + 2k_d \left\lfloor \frac{N_a + i}{2N_a} \right\rfloor \pi$$

where $\Phi_i'$ is the unwrapped phase difference for frequency band i between a spectral component comprised in the first sound signal that is comprised in frequency band i and a spectral component comprised in the second sound signal that is also comprised in frequency band i, $\Phi_i$ is the wrapped phase difference for frequency band i between a spectral component comprised in the first sound signal that is comprised in frequency band i and a spectral component comprised in the second sound signal that is also comprised in frequency band i, $N_a$ is a frequency band associated with the estimated aliasing frequency, $k_d$ is an unwrapping direction, and $\lfloor \ \rfloor$ denotes a floor function.

5. The apparatus as claimed in claim 1, wherein before estimating the aliasing frequency, the processor is further configured to:
for each spectral component in the first and second sound signals, obtain a covariance matrix that represents the covariance of corresponding spectral components in the first and second sound signals and determine an eigenvalue associated with an eigenvector of that matrix;
identify any spectral components in the first and second sound signals that are associated with a covariance matrix that has an eigenvalue that is below a predetermined threshold;
disregard any phase difference that was obtained from one of the identified spectral components when estimating the aliasing frequency;
determine a replacement phase difference by interpolating between phase differences obtained from spectral components that were identified as having covariance matrices with eigenvalues above the predetermined threshold; and
replace a disregarded phase difference with a replacement phase difference.

6. The apparatus as claimed in claim 1, wherein the processor is further configured to determine the wrapping direction in dependence on spectral components in more than three of the plurality of frequency bands that are comprised in the first and second sound signals and to unwrap the plurality of phase differences in dependence on the wrapping direction.

7. The apparatus as claimed in claim 1, wherein before fitting the lines to the set of phase differences for estimating the wrapping direction, the processor is further configured to denoise the phase differences in each set by:
identifying any phase differences that should be classified as noise by determining a distance between each phase difference in a respective set and the line fitted to that set and classifying as noise any phase difference that is associated with a distance greater than an adaptive threshold, wherein the adaptive threshold is determined in dependence on a number of phase differences that are respectively above or below the line fitted to each set; and
removing any phase differences that are classified as being noise from their respective set.

8. The apparatus as claimed in claim 1, wherein the processor is further configured to, after unwrapping the plurality of phase differences:
identify a phase difference that has been unwrapped incorrectly in dependence on a difference between an unwrapped phase difference obtained from spectral components comprised in a particular frequency band and a phase difference that is predicted for that frequency band by the slope of the line fitted to the unwrapped phase differences.

9. The apparatus as claimed in claim 8, wherein the processor is further configured to determine whether or not the phase differences should be unwrapped by:
summing the plurality of phase differences to obtain a first sum;
for each frequency band, determining a difference between an unwrapped phase difference obtained from spectral components comprised in that particular frequency band and a phase difference that is predicted for that frequency band by the slope of the line fitted to the unwrapped phase differences;
summing the differences determined for the plurality of frequency bands to obtain a second sum; and
determining whether or not the phase differences should be unwrapped in dependence on a difference between the first sum and the second sum.

10. The apparatus as claimed in claim 1, wherein the processor is further configured to denoise the unwrapped phase differences by repeating the following operations (a)-(d), with progressively reduced sets of unwrapped phase differences until the apparatus obtains one of the sets of unwrapped phase differences that meets at least one of the situations: (i) the overall error for the one set of unwrapped phase differences is below a predetermined threshold; and (ii) a predetermined percentage of the unwrapped phase differences have been removed;
wherein the operations (a)-(d) comprise:
(a) fitting the line to the unwrapped phase differences;
(b) identifying any unwrapped phase differences that should be classified as noise by determining a distance between each unwrapped phase difference and the fitted line and classifying as noise any unwrapped phase difference that is associated with a distance that is greater than a predetermined threshold;
(c) removing any unwrapped phase differences that are classified as noise to form a reduced set of phase differences; and
(d) determining an overall error for the reduced set of unwrapped phase differences in dependence on the distance between every unwrapped phase difference in the reduced set and the line.

11. The apparatus as claimed in claim 1, wherein the processor is further configured to determine a direction of arrival of a sound signal at the first microphone and the second microphone in dependence on the unwrapped phase differences.

12. A method implemented by a processor of an apparatus, the method comprising:
    obtaining a plurality of phase differences, wherein each phase difference represents a difference in phase between (i) a spectral component in a first sound signal captured by a first microphone, and (ii) a spectral component in a second sound signal captured by a second microphone,
        wherein each spectral component is part of a signal spectrum for its respective sound signal,
        wherein each signal spectrum represents its respective sound signal as a plurality of spectral components, and
        wherein each spectral component is comprised in a respective frequency band of a plurality of frequency bands representing the respective sound signal;
    estimating an aliasing frequency;
    unwrapping the plurality of phase differences in dependence on the estimated aliasing frequency, including determining a wrapping direction for unwrapping each phase difference by assigning each phase difference to one of one or more sets, wherein:
        (a) each set comprises phase differences obtained from spectral components that are comprised in a particular segment of the plurality of frequency bands of the first and second sound signals; and
        (b) each phase difference is assigned to one of the sets in dependence on the estimated aliasing frequency, such that none of the phase differences assigned to a particular set is wrapped relative to the other phase differences assigned to the same set;
    fitting a line to each set of phase differences; and
    estimating the wrapping direction in dependence on slopes of the lines fitted to the sets of phase differences,
        wherein each phase difference obtained from spectral components that are comprised in one frequency band is unwrapped independently of any phase difference obtained from spectral components that are comprised in another frequency band.

13. A non-transitory machine-readable storage medium having stored thereon processor-executable instructions, which when executed by a processor of the apparatus, cause the apparatus to implement a method comprising:
    obtaining a plurality of phase differences, wherein each phase difference represents a difference in phase between (i) a spectral component in a sound signal captured by a first microphone, and (ii) a spectral component in a second sound signal captured by a second microphone,
        wherein each spectral component is part of a signal spectrum for its respective sound signal,
        wherein each signal spectrum representing its respective sound signal as a plurality of spectral components, and
        wherein each spectral component is comprised in a respective frequency band of a plurality of frequency bands representing the respective sound signal;
    estimating an aliasing frequency; and
    unwrapping the plurality of phase differences in dependence on the estimated aliasing frequency, including determining a wrapping direction for unwrapping each phase difference by assigning each phase difference to one of one or more sets, wherein:
        (a) each set comprises phase differences obtained from spectral components that are comprised in a particular segment of the plurality of frequency bands of the first and second sound signals; and
        (b) each phase difference is assigned to one of the sets in dependence on the estimated aliasing frequency, such that none of the phase differences assigned to a particular set is wrapped relative to the other phase differences assigned to the same set;
    fitting a line to each set of phase differences; and
    estimating the wrapping direction in dependence on slopes of the lines fitted to the sets of phase differences,
        wherein each phase difference obtained from spectral components that are comprised in one frequency band is unwrapped independently of any phase difference obtained from spectral components that are comprised in another frequency band.

14. The method as claimed in claim 12, further comprising:
    estimating the aliasing frequency in dependence on phase differences obtained from spectral components in more than three of the plurality of frequency bands that are comprised in the first and second sound signals.

15. The method as claimed in claim 12, further comprising:
    estimating the aliasing frequency in dependence on a fundamental frequency associated with the phase differences obtained from the spectral components that are comprised in the first and second sound signals.

16. The non-transitory machine-readable storage medium as claimed in claim 13, wherein the method further comprises:
    estimating the aliasing frequency in dependence on phase differences obtained from spectral components in more than three of the plurality of frequency bands that are comprised in the first and second sound signals.

17. The non-transitory machine-readable storage medium as claimed in claim 13, wherein the method further comprises:
    estimating the aliasing frequency in dependence on a fundamental frequency associated with the phase differences obtained from the spectral components that are comprised in the first and second sound signals.

18. The apparatus as claimed in claim 1, wherein the phase differences are obtained from three or more frequency bands.

19. The method as claimed in claim 12, wherein the phase differences are obtained from three or more frequency bands.

20. The non-transitory machine-readable storage medium as claimed in claim 13, wherein the phase differences are obtained from three or more frequency bands.

* * * * *

UNITED STATES PATENT AND TRADEMARK OFFICE
CERTIFICATE OF CORRECTION

PATENT NO. : 10,834,505 B2
APPLICATION NO. : 16/424147
DATED : November 10, 2020
INVENTOR(S) : Geiger et al.

It is certified that error appears in the above-identified patent and that said Letters Patent is hereby corrected as shown below:

On the Title Page

Item (56), Foreign Patent Documents, Citation 2: "WO 3529479 A1 11/1995" should read -- WO 9529479 A1 11/1995 --.

In the Claims

Claim 4: Column 17, Line 22: "where $\Phi'_i$ is the unwrapped phase difference for frequency" should read -- where $\Phi''_i$ is the unwrapped phase difference for frequency --.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*